US008219786B1

(12) United States Patent
Nuechterlein

(10) Patent No.: US 8,219,786 B1
(45) Date of Patent: Jul. 10, 2012

(54) REQUEST COALESCING FOR INSTRUCTION STREAMS

(75) Inventor: David William Nuechterlein, Longmont, CO (US)

(73) Assignee: NVIDIA Corporation, Santa Clara, CA (US)

( * ) Notice: Subject to any disclaimer, the term of this patent is extended or adjusted under 35 U.S.C. 154(b) by 647 days.

(21) Appl. No.: 11/688,480

(22) Filed: Mar. 20, 2007

(51) Int. Cl.
*G06F 9/30* (2006.01)

(52) U.S. Cl. ........................................................ 712/205

(58) Field of Classification Search ........................ None
See application file for complete search history.

(56) References Cited

U.S. PATENT DOCUMENTS

| | | | | |
|---|---|---|---|---|
| 6,002,412 | A * | 12/1999 | Schinnerer | 345/558 |
| 7,492,368 | B1 * | 2/2009 | Nordquist et al. | 345/502 |
| 7,506,134 | B1 * | 3/2009 | Juffa et al. | 712/16 |
| 2005/0108499 | A1 * | 5/2005 | Huang et al. | 711/217 |

OTHER PUBLICATIONS

Jolitz et al. "Porting UNIX to the 386: A practical approach". May 1, 2006.*

Patterson, David. Hennessy, John. "Computer Architecture: A Quantitative Approach". Morgan Kaufmann Publishers, Inc. Second Edition, 1996. pp. 39-41.*

Tanenbaum, Andrew. "Structured Computer Organization". Prentice-Hall, Inc. pp. 10-12, 1984.*

* cited by examiner

*Primary Examiner* — Robert Fennema
(74) *Attorney, Agent, or Firm* — Patterson & Sheridan, LLP

(57) ABSTRACT

Sequential fetch requests from a set of fetch requests are combined into longer coalesced requests that match the width of a system memory interface in order to improve memory access efficiency for reading the data specified by the fetch requests. The fetch requests may be of different classes and each data class is coalesced separately, even when intervening fetch requests are of a different class. Data read from memory is ordered according to the order of the set of fetch requests to produce an instruction stream that includes the fetch requests for the different classes.

20 Claims, 9 Drawing Sheets

Pop a FIFO entry 500
Aligned? 505
N
Generate partial fetch request 510
Y
Generate an aligned maximum fetch request 520
Mainline? 525
N
Can Coalesce? 545
Y
Combine with previous subroutine request 550
N
Y
Can Coalesce? 530
Y
Combine with previous mainline request 535
N
Store the mainline request(s) 540
Store the subroutine request(s) 555
N
Entry complete? 542
Y
Entry coalescing complete 560
Y
Entry complete? 557
N

REQUEST COALESCING FOR INSTRUCTION STREAMS

BACKGROUND OF THE INVENTION

1. Field of the Invention

The present invention generally relates to reading data from memory and more specifically to a system and method for coalescing sequential fetch requests for a data class that are interleaved with fetch requests for other data classes.

2. Description of the Related Art

Current data processing includes systems and methods developed to read data from memory efficiently. Typically, a cache is used to store data that is read from memory in portions sized based on the memory interface. A cache is particularly well-suited to improve memory access efficiency when series of small memory reads (fetches) are in sequence. When the first fetch is completed a portion of the following fetch in the sequence is available in the cache since reading the small first fetch also read some of the adjacent memory locations that are needed for a part of the second fetch. A cache is not a good solution when the data for the second fetch is not present in memory when the data for the first fetch is read. In that case, the cache stores the incorrect data for the part of the second fetch. In systems where the memory writes can be snooped, the cache entry can be updated or invalidated when a corresponding memory write occurs in order to maintain cache coherency. However, when the memory writes cannot be snooped it is not possible to determine whether or not the data for the part of the second fetch that is stored in the cache is correct.

Accordingly, what is needed in the art is a system and method for performing a sequence of fetches from memory when a cache cannot be used to improve memory access efficiency.

SUMMARY OF THE INVENTION

One advantage of the disclosed system is that sequential fetch requests from a set of fetch requests are combined into longer coalesced requests that match the width of a system memory interface in order to improve memory access efficiency for reading the data specified by the fetch requests. Coalesced requests that exceed the system memory interface width may be read in bursts. Another advantage of the disclosed system and method is that the fetches are performed after the data is available in the memory. Therefore, the data is correct and there is no need to maintain cache coherence by snooping memory writes. The fetch requests may be for different data classes and each data class is coalesced separately, even when intervening fetch requests are of a different class. Data read from memory is ordered according to the order of the set of fetch requests to produce an instruction stream that includes the fetch requests for the different data classes.

Various embodiments of a method of the invention for coalescing fetch requests for multiple data classes, include receiving a first fetch request for a first data class, receiving a second fetch request for a second data class, receiving a third fetch request for the first data class that is sequential to the first fetch request. The first fetch request and the third fetch request are combined to produce a coalesced fetch request for the first data class. First data specified by the coalesced fetch request is fetched from a memory and second data specified by the second fetch request is fetched from the memory. An instruction stream is output that includes the first data and the second data ordered according to the first fetch request, the second fetch request, and the third fetch request.

Various embodiments of the invention for coalescing fetch requests for multiple data classes include an instruction stream FIFO (first-in, first-out memory), a memory, and a coalesce unit. The instruction stream FIFO is configured to store the fetch requests in entries, wherein fetch requests for different data classes are interleaved. The memory is configured to store data and instructions that are read when coalesced fetch requests are fulfilled. The coalesce unit is coupled to the memory and configured to read the entries of the instruction stream FIFO, combine fetch requests of a same data class that are stored in sequential locations in a memory to produce coalesced fetch requests, read data corresponding to the coalesced fetch requests from the memory, and order the data according to an order of the fetch requests stored in the entries of the instruction stream FIFO to produce an instruction stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
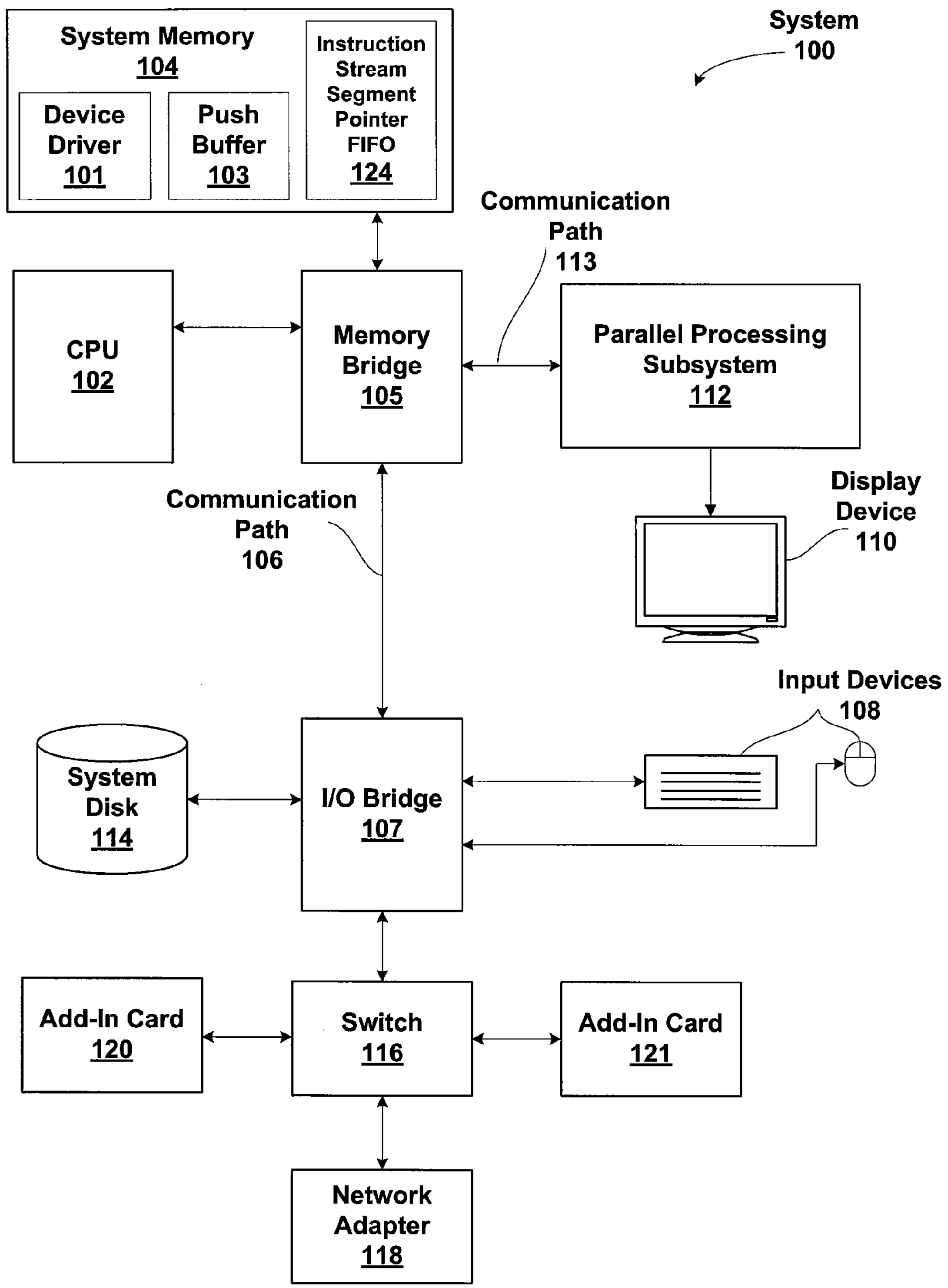
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). System memory 104 includes a device driver 101 that is configured to provide read requests specifying the location of data and program instructions that are stored in memory to parallel processing subsystem 112. The read requests are stored in an instruction stream segment pointer FIFO (first-in, first-out memory) 124 that may be stored in system memory 104 or memory within other devices of system 100. Each read request includes a pointer to a segment of the instruction stream and a length. The data and program instructions are stored in one or more push buffers, such as push buffer 103 and may be stored in system memory 104 or memory within other devices of system 100. Device driver 101 is executed by CPU 102 to translate instructions for execution by parallel processing subsystem 112 based on the specific capabilities of parallel processing subsystem 112. The instructions may be specified by an application programming interface (API) which may be a conventional graphics API such as Direct3D or OpenGL.

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
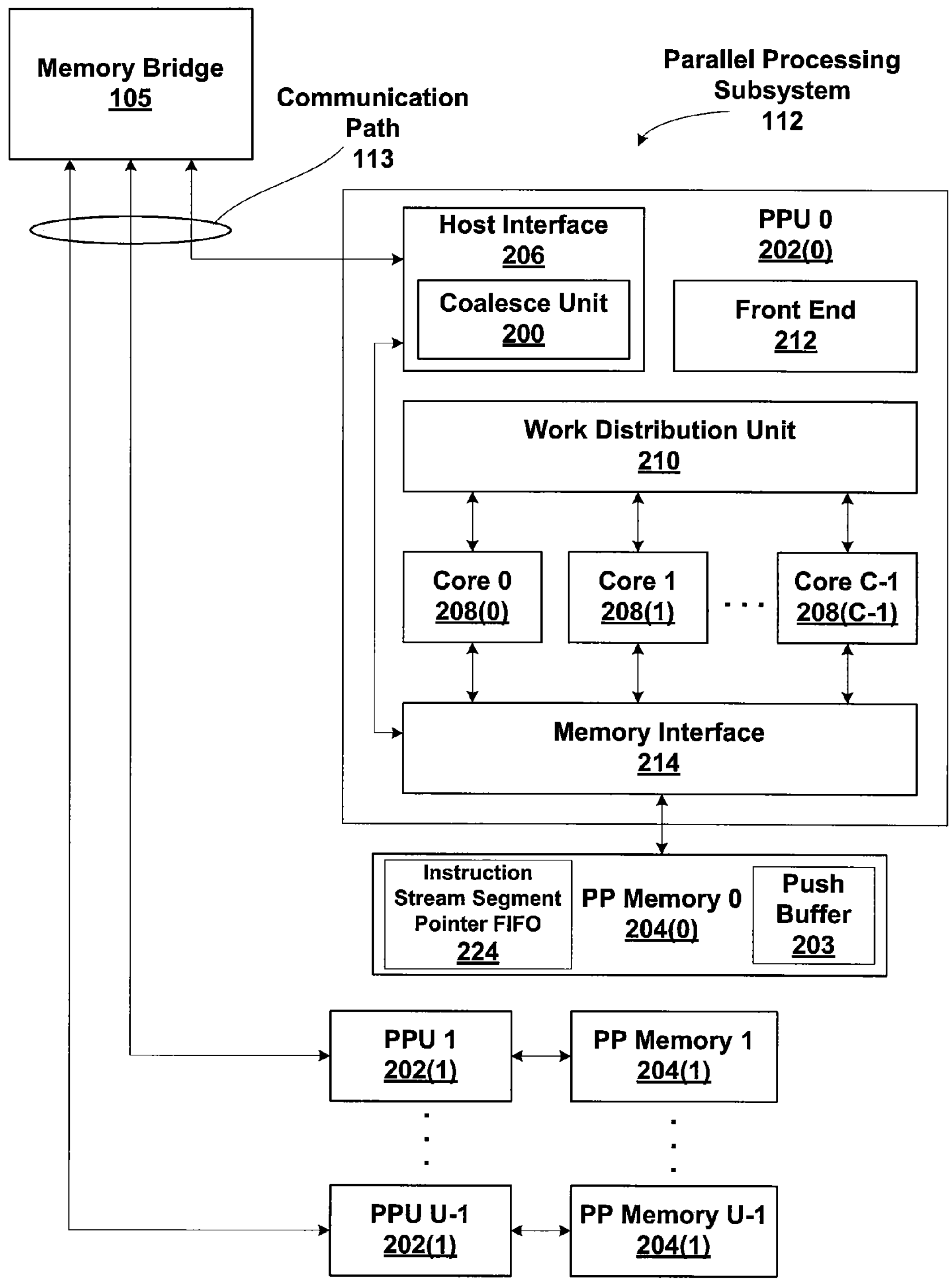
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Front end unit 212 and memory interface 214 may be of generally conventional design, and a detailed description is omitted as not being critical to the present invention. Host interface 206 includes a coalesce unit 200 that obtains fetch requests from device driver 101 that specify instructions and/or data stored in a push buffer 203 within PP memory 0 204(0). Coalesce unit 200 combines the specified fetch requests to read data from push buffer 203. Coalesce unit 200 may reorder the specified fetch requests when they are combined. After receiving the data for the combined fetch requests from push buffer 203 via communication path 113, the data may be saved, and reordered. This reordering of the data is performed in a manner such that is the data appears in the same order in the instruction stream as if the specified fetch requests had not been reordered. Coalesce unit 200 then outputs the data, including program instructions and data for processing, as the instruction stream to front end 212. The data read from a push buffer includes data and/or program instructions.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, device driver 101 writes a stream of commands for each PPU 202 to a push buffer, such as push buffer 103 or 203, which may be located in system memory 104, PP memory 204, or another storage location accessible to both CPU 102 and PPU 202. Coalesce unit 200 reads data and program instructions for the instruction stream from the push buffer using fetch requests provided by device driver 101 in an instruction stream segment pointer FIFO 224. PPU 202 executes the program instructions from the instruction stream asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
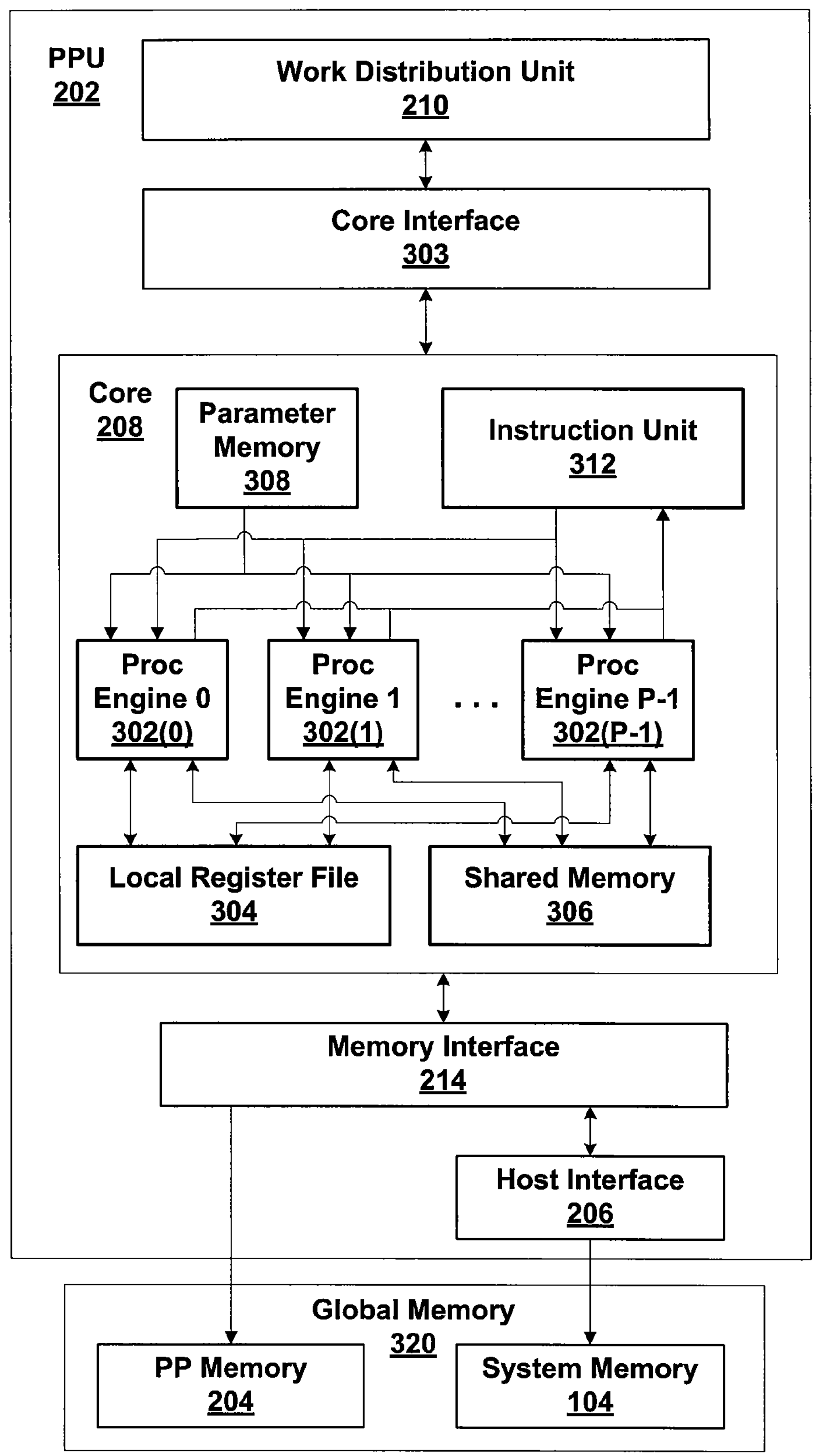
FIG. 3 is a block diagram of a parallel processing unit for the parallel processing subsystem of FIG. 2 in accordance with one or more aspects of the present invention; I don't see how FIG. 3 pertains. Seems unnecessary.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache (s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Arrays and Cooperative Thread Arrays

In some embodiments, multithreaded processing core 208 of FIG. 3 can execute general-purpose computations using thread arrays. As used herein, a "thread array" is a group consisting of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAs. As with other types of thread arrays, a CTA is a group of multiple threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, device driver 101 executing on CPU 102 of FIG. 1 writes instructions defining the CTA to a push buffer 203 or 103, from which the instructions are read by a PPU 202. The instructions advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to push buffer 203 or 103 together with the instructions. In response to the instructions, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Instruction Stream FIFO Request Coalescing

Figure 4A:
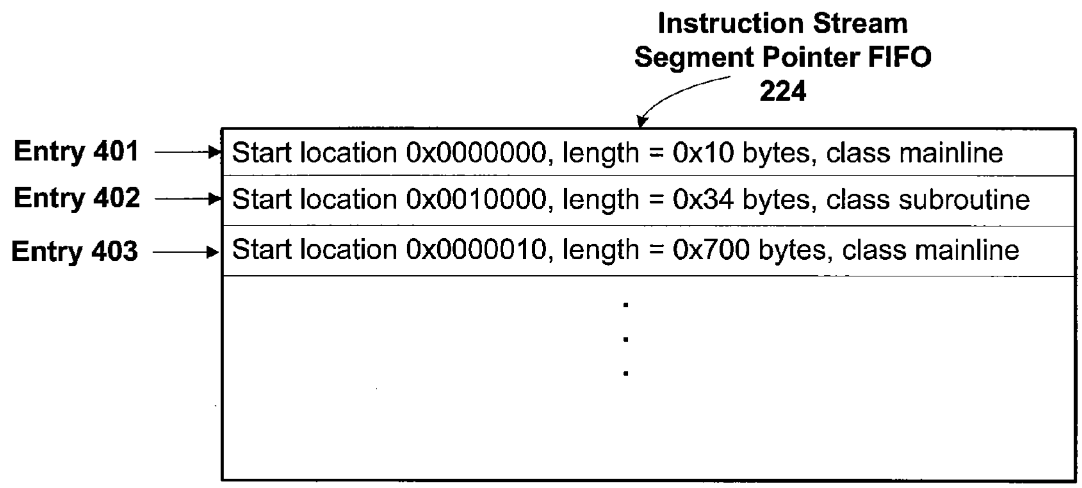
FIG. 4A is a diagram illustrates an instruction stream FIFO in accordance with one or more aspects of the present invention.

FIG. 4A is a diagram illustrates instruction stream segment pointer FIFO 224, in accordance with one or more aspects of the present invention. Entries 401, 402, and 403 of instruction stream segment pointer FIFO 224 are written by device driver 101 and each entry specifies the start location in a push buffer. In addition to the start location, each entry also includes a length and class. The class indicates a type of data, either subroutine or mainline, that is fetched from the push buffer. Mainline data is typically sets of instructions that determine how data is processed. Subroutine data is typically portions of data to be processed by the sets of instructions, such as a collection of vertices defining a graphics model. A control stream includes sets of instructions interleaved with data to be processed. A push buffer may include a combination of subroutine and mainline data and entries of the instruction stream segment pointer FIFO 224 are written by device driver 101 to select portions of the subroutine and mainline data to produce a particular instruction stream and resulting image.

Sequential entries of the same data class may be combined to form a coalesced fetch request. For example, entry 401 and entry 403 can be combined to form a coalesced fetch request with a start address of 0x00000000 and length of 0x710. Reading the single coalesced fetch request from memory may be more efficient than reading separate fetch requests for entry 401 and 403. Typically, memory subsystems are more efficient when they are accessed at the full width of the memory, and in a burst that begins on a particular alignment and continues for a particular burst length. If the requests to the memory subsystem are less than this ideal, multiple memory accesses may be required, causing a loss of memory bandwidth efficiency. For example, if not reordered, the sequence of fetches for entries 401, 402, 403 may be inefficient since the fetch for 401 may be smaller than the optimal memory fetch, and the fetch for 403 may not meet the alignment requirements. By coalescing fetches 401 and 403, memory efficiency may be increased. Persons skilled in the art, however, will understand that perhaps only a first portion of the request 403 can be combined with request 401 to fulfill the memory efficiency requirements, and the remainder of fetch 403 can be done after fetching 402.

Different portions of a push buffer may be written at different times. For example, the data corresponding to entry 401 may be written before the data corresponding to entry 403 is written. Therefore, using a cache to improve memory bandwidth utilization may result in incorrect data for entry 403 if care is not taken when determining when fetches can be made for more data than was specified by their entries in instruction stream segment pointer FIFO 124 or 224. Specifically, if a portion of the data for entry 403 is read and cached when the data for entry 401 is fetched, that portion of data for entry 403 may not be correct since it may not have been written in the push buffer. Once an entry is written in instruction stream segment pointer FIFO 224, the data is guaranteed to be present in the push buffer for the fetch request.

An alternative to coalescing the fetch requests is to copy the subroutines in memory to construct a push buffer with the data stored in sequential entries. Such a push buffer can be read efficiently, without even needing a cache since the data is read and output in a linear order. A disadvantage of the alternative is that the data must be copied within memory to construct the linear push buffer, so the memory bandwidth that is saved fetching the linear push buffer may not be greater than the memory bandwidth that is needed to create the linear push buffer.

Figure 4B:
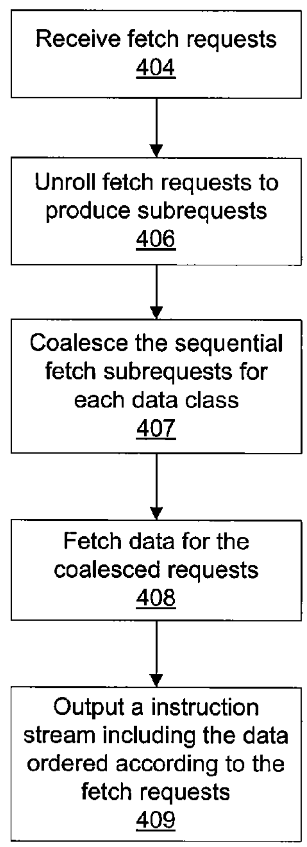
FIG. 4B is a flow diagram of method steps for coalescing fetch requests to produce an instruction stream in accordance with one or more aspects of the present invention.

FIG. 4B is a flow diagram of method steps for coalescing fetch requests to produce an instruction stream, in accordance with one or more aspects of the present invention. In step 404, coalesce unit 200 receives fetch requests from instruction stream segment pointer FIFO 224. In step 406, coalesce unit 200 unrolls the fetch requests by breaking the fetch requests into smaller subrequests, such that no subrequest spans the optimal memory alignment boundaries or is greater than the optimal burst length for memory accesses. In step 407, coalesce unit 200 coalesces these subrequests, combining sequential fetch requests for each data class to produce coalesced fetch requests. In step 408, coalesce unit 200 fetches the data specified by the coalesced fetch requests. Note that the data for coalesced fetch requests is not necessarily fetched in the same order in which it is specified in instruction stream segment pointer FIFO 224. For example, when subrequests for entries 401 and 403 of FIG. 4A are coalesced, some of the data for entry 403 is fetched before the data for entry 402. In step 409, coalesce unit 200 outputs an instruction stream including the data fetched in step 408. Coalesce unit 200 orders the data according to the fetch requests received in step 404. Therefore, the data for entry 402 of FIG. 4A is inserted into the instruction stream between the data for entry 401 and entry 403.

Figure 4C:
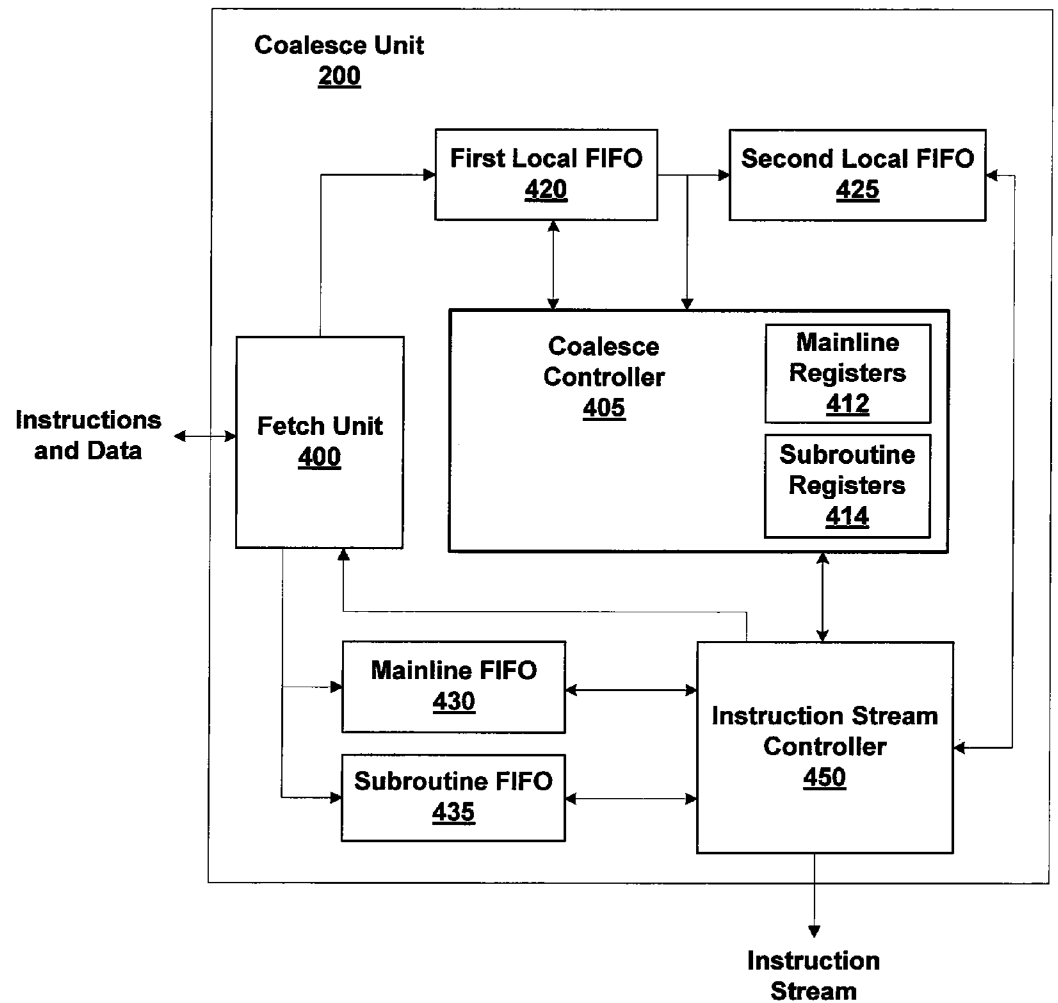
FIG. 4C is a block diagram of the coalesce unit of FIG. 2 in accordance with one or more aspects of the present invention.

FIG. 4C is a block diagram of coalesce unit 200 of FIG. 2, in accordance with one or more aspects of the present invention. Coalesce unit 200 includes a fetch unit 400 that is used to read data specified by coalesced fetch requests. Fetch unit 400 also copies entries from instruction stream segment pointer FIFO 224 to a first local FIFO 420. A coalesce controller 405 determines whether there are valid entries in first local FIFO 420 and pops each valid entry when space is available in mainline registers 412 and subroutine registers 414. Each entry of first local FIFO 420 that is popped is also pushed into a second local FIFO 425 for use in ordering the fetched data in the instruction stream according to the order of the entries in first local FIFO 420.

Figure 5:
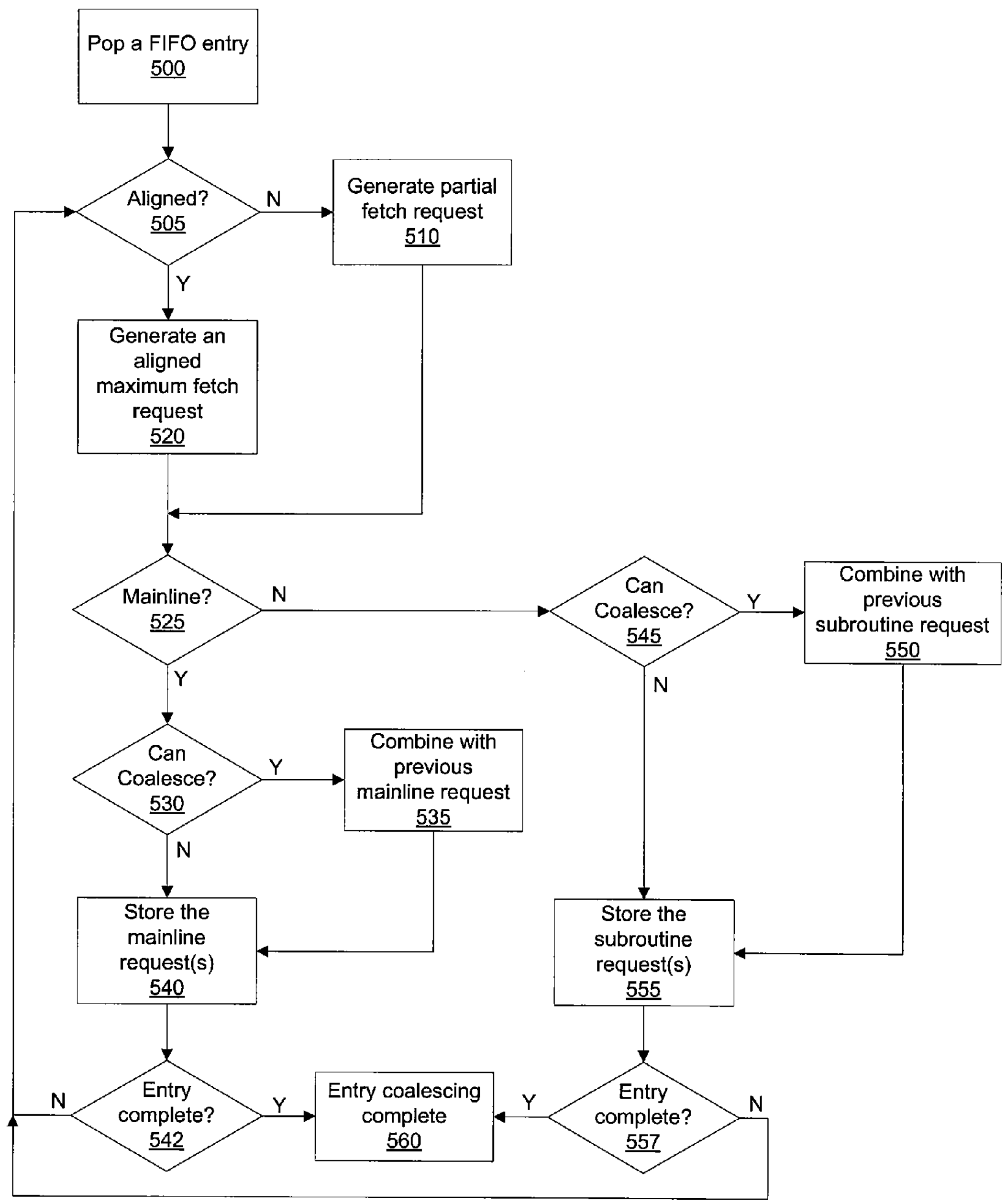
FIG. 5 is a flow diagram of method steps for processing an instruction stream FIFO to coalesce memory fetch requests in accordance with one or more aspects of the present invention.

Mainline registers 412 and subroutine registers 414 are used by coalesce controller 405 to unroll, generate, and then store coalesced fetch requests, as described in conjunction with FIG. 5. In some embodiments of the present invention, mainline registers 412 and subroutine registers 414 each include 8 registers to store 8 coalesced fetch requests. An instruction stream controller 450 reads coalesced fetch requests from mainline registers 412 and subroutine registers 414 and outputs the coalesced requests to fetch unit 400 in order to read the data specified by each coalesced fetch request, as described in conjunction with FIG. 6A. Fetch unit 400 tracks the data class for each fetch request and returns the read data to a FIFO corresponding to the data class. Mainline data is returned to a mainline FIFO 430 and subroutine data is returned to a subroutine FIFO 435. In some embodiments of the present invention, mainline FIFO 430 and subroutine FIFO 435 are each 64 or 128 bits wide. When data is available in mainline FIFO 430 or subroutine FIFO 435, instruction stream controller 450 pops a fetch request from second local FIFO 425 and reads data corresponding to the fetch request at the output of mainline FIFO 430 or subroutine FIFO 435, as described in conjunction with FIG. 6B. Instruction stream controller 450 orders the fetched data read from mainline FIFO 430 and subroutine FIFO 435 according to the entries popped from second local FIFO 425 to produce an instruction stream.

FIG. 5 is a flow diagram of method steps for processing instruction stream segment pointer FIFO 124 or 224 to coalesce memory read requests, in accordance with one or more aspects of the present invention. In step 500 coalesce controller 405 pops an entry containing a fetch request from first local FIFO 420. As previously described in conjunction with FIG. 4A, each fetch request includes a start location and a length. In step 505 coalesce controller 405 determines if the fetch request aligned to the preferred memory alignment. The request is not aligned if the start or end of the fetch request crosses an alignment boundary. For example, in one embodiment of the present invention, the memory is 64 bits wide (8 bytes), and the maximum burst length is 256 Bytes, so a burst of length of 32 starting on 256 byte aligned addresses is ideal. Accesses of the preferred alignment (256 bytes) and of the maximum burst length are consecutive fetches of 256 bytes on 256 byte boundaries.

If, in step 505 coalesce controller 405 determines that the fetch request is not aligned, then in step 510 coalesce controller 405 generates a partial fetch request to read less data than is supported by the memory width and proceeds to step 525. A partial fetch request may be generated at the start of a request, at the end of a request, or for a request that reads less data than the memory width. Coalesce controller 405 indicates the bytes within the fetch request that are not needed. If, in step 505 coalesce controller 405 determines that the fetch request is not aligned, then in step 520 coalesce controller generates an aligned maximum fetch request in order to, segment the popped fetch request into multiple aligned requests memory width, with the exception of the first and/or last request that may be smaller than the memory width.

In step 525 coalesce controller 405 determines if the fetch data request class is mainline, and, if so, in step 530 coalesce controller 405 determines if the fetch request can be combined with the last fetch request stored in mainline registers 412. Since only sequential fetch requests are combined, it is only necessary to check if a fetch request can be combined with the last received fetch request, not all of the fetch requests stored in mainline registers 412. In some embodiments of the present invention, mainline registers 412 and subroutine registers 414 are FIFOs.

If, in step 530 coalesce controller 405 determines that the fetch request can be combined with the last fetch request stored in mainline registers 412, then in step 535 the mainline fetch request is combined with the last received mainline fetch request, producing a coalesced mainline fetch request. In step 540 the coalesced mainline fetch request(s) is stored in mainline registers 412. Note, that the fetch request popped in step 500 may be stored as one or more coalesced mainline fetch requests in mainline registers 412. A partial fetch request generated in step 510 may even be combined with the last received mainline fetch request, so that an additional register in mainline registers 412 is not written. If, in step 535 the mainline fetch request cannot be combined with the last received mainline fetch request, then in step 540 the mainline fetch request(s) is stored in mainline registers 412.

In step 542 coalesce controller 405 determines if coalescing of the FIFO entry popped in step 500 is complete, and, if so, then in step 560 coalesce controller 405 has completed processing and the steps shown in FIG. 5 may be repeated to process another entry of instruction stream segment pointer FIFO 124 or 224. If, in step 542 coalesce controller 405 determines that coalescing of the FIFO entry popped in step 500 is not complete, i.e., the fetch request has not been completely coalesced, then coalesce controller 405 returns to step 505 to continue coalescing the fetch request.

If, in step 525 coalesce controller 405 determines that the fetch request data class is not mainline, then the fetch request data class is subroutine, and in step 545 coalesce controller 405 determines if the fetch request can be combined with the last fetch request stored in subroutine registers 414. If, in step 545 coalesce controller 405 determines that the fetch request can be combined with the last fetch request stored in subroutine registers 414, then in step 550 the subroutine fetch request is combined with the last received subroutine fetch request producing a coalesced subroutine fetch request. In step 555 the coalesced subroutine fetch request(s) is stored in subroutine registers 414. Note, that the fetch request popped in step 500 may be stored as one or more coalesced subroutine fetch requests in subroutine registers 414. A fetch request that is smaller than the maximum request size may even be combined with the last received subroutine fetch request, so that an additional register in subroutine registers 414 is not written. If, in step 545 the mainline fetch request cannot be combined with the last received subroutine fetch request, then in step 555 the subroutine fetch request(s) is stored in subroutine registers 414.

In step 557 coalesce controller 405 determines if coalescing of the FIFO entry popped in step 500 is complete, and, if so, then in step 560 coalesce controller 405 has completed processing and the steps shown in FIG. 5 may be repeated to process another entry of instruction stream segment pointer FIFO 124 or 224. If, in step 557 coalesce controller 405 determines that coalescing of the FIFO entry popped in step 500 is not complete, i.e., the fetch request has not been completely coalesced, then coalesce controller 405 returns to step 505 to continue coalescing the fetch request.

Figure 6A:
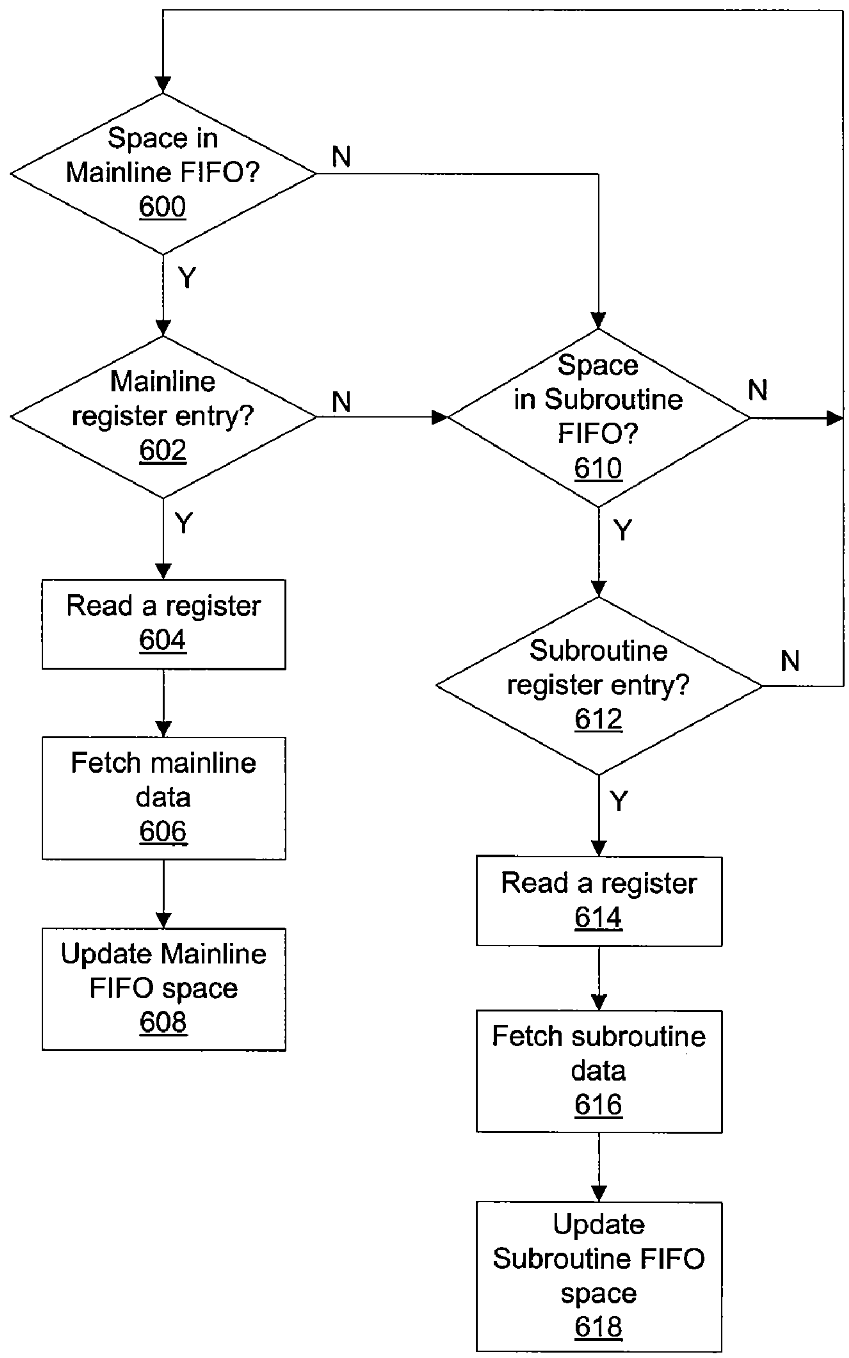
FIG. 6A is a flow diagram of method steps for fetching data and instructions according to the coalesced memory read requests in accordance with one or more aspects of the present invention.

FIG. 6A is a flow diagram of method steps for fetching instructions and data according to the coalesced memory fetch requests, in accordance with one or more aspects of the present invention. In step 600 instruction stream controller 450 determines if space is available in mainline FIFO 430 to store data and/or instructions that will be returned from memory via fetch request 400 when each fetch request is completed. If, in step 600 instruction stream controller 450 determines that space is available in mainline FIFO 430, then in step 602 instruction stream controller 450 determines if a coalesced fetch request is available in mainline registers 412. If, in step 602 instruction stream controller 450 determines that a coalesced fetch request is available in mainline registers 412, then in step 604 instruction stream controller 450 reads a fetch request from mainline registers 412.

When space is available in mainline registers 412, instruction stream controller 450 may read a fetch request that has not been coalesced, particular if a fetch request is not available in first local FIFO 420. Therefore, when the processing is not memory bandwidth limited, the fetch requests may be read before they are coalesced. Conversely, when the processing is memory bandwidth limited the number of fetch requests output by fetch unit 400 will be limited and fetch requests will remain in mainline registers 412 for more clock cycles. During those clock cycles the fetch requests may be coalesced, thereby improving memory bandwidth utilization. Therefore, the present invention adaptively coalesces the fetch requests as the need to improve memory bandwidth utilization increases. The additional processing latency needed to perform the coalescing is only incurred when memory bandwidth is limited.

In step 606 instruction stream controller 450 outputs the mainline fetch request read in step 604 to fetch unit 400 in order to read the data specified by the fetch request. Note that data refers to data or instructions that are stored in a push buffer. In step 608 the space available in mainline registers 412 is updated (reduced) for the mainline fetch request output in step 606. When the fetched data and/or instructions are returned by fetch unit 400 they are stored in mainline FIFO 430. Note that multiple fetch requests may be in flight at any time, in order to further increase memory bandwidth efficiency. Instruction stream controller 450 then proceeds to order the data and instructions as specified by the original fetch requests in instruction stream segment pointer FIFO 124 or 224, as described in conjunction with FIG. 6B.

If, in step 600 instruction stream controller 450 determines that space is not available in mainline FIFO 430, then in step 610 instruction stream controller 450 determines if space is available in subroutine FIFO 435. If, in step 610 instruction stream controller 450 determines that space is not available in subroutine FIFO 435, then command stream controller 450 returns to step 600, allowing for more requests to be coalesced. If, in step 610 instruction stream controller 450 determines that space is available in subroutine FIFO 435, then in step 612 instruction stream controller 450 determines if a fetch request is available in subroutine registers 414. If, in step 612 instruction stream controller 450 determines that a fetch request is not available in subroutine registers 414, then instruction stream controller 450 returns to step 600.

If, in step 612 instruction stream controller 450 determines that a fetch request is available in subroutine registers 414, then in step 614 instruction stream controller 450 reads a coalesced fetch request from subroutine registers 414. In step 616 instruction stream controller 450 outputs the subroutine fetch request read in step 614 to fetch unit 400 in order to read the data specified by the coalesced fetch request. In step 618 the space available in subroutine FIFO 435 is updated (reduced) for the subroutine fetch request output in step 616. When the fetched data are returned by fetch unit 400 it is stored in subroutine FIFO 435. As shown in FIG. 6A mainline class fetch requests are given higher priority than subroutine class fetch requests. In other embodiments of the present invention, different priority schemes are used to select either a mainline fetch request or a subroutine fetch request. Furthermore, although only two different classes of fetch requests are described, in other embodiments of the present invention, additional classes of fetch requests are coalesced and included in the instruction stream.

Figure 6B:
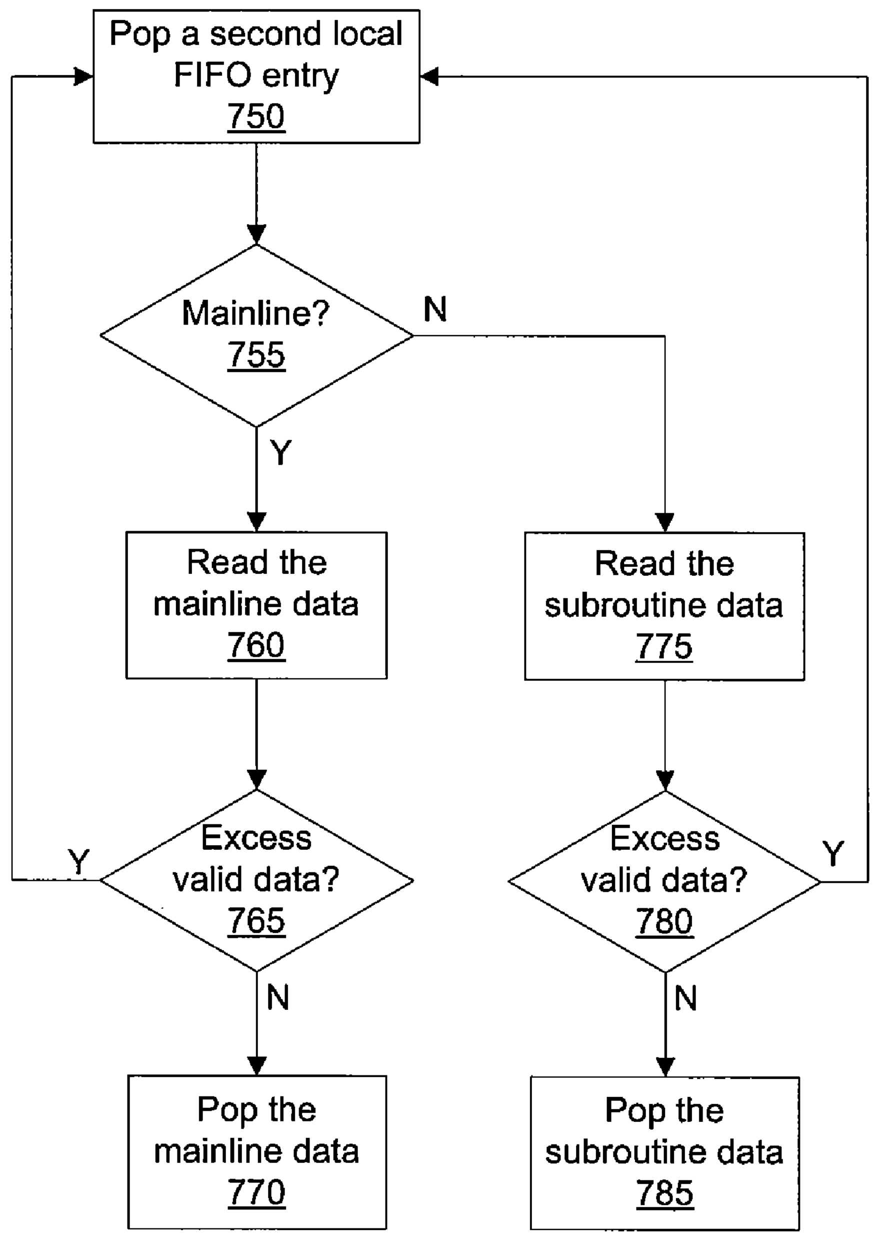
FIG. 6B is a flow diagram of method steps for ordering the fetched data to produce the instruction stream specified by an instruction stream FIFO in accordance with one or more aspects of the present invention.

FIG. 6B is a flow diagram of method steps for ordering the fetched data stored in mainline FIFO 430 and subroutine FIFO 435 to produce the instruction stream specified by instruction stream segment pointer FIFO 124 or 224, in accordance with one or more aspects of the present invention. In step 750 instruction stream controller 450 pops an entry storing an original fetch request from second local FIFO 425. In step 755 instruction stream controller 450 determines if the original fetch request (copied from instruction stream segment pointer FIFO 124 or 224) is a mainline class fetch request, and, if so, then in step 760 instruction stream controller 450 reads the mainline data from mainline FIFO 430. When mainline FIFO 430 is empty, instruction stream controller 450 waits for data to be pushed onto mainline FIFO 430 before completing step 760.

Specifically, instruction stream controller 450 pops each entry from mainline FIFO 430 that only contains data specified by the popped fetch request. An entry may include data specified by a subsequent fetch request that was coalesced with the popped fetch request. Therefore, an entry should not be popped from mainline FIFO 430 until all of the data included in the entry that is needed has been read for the instruction stream. As previously described, a byte mask may be included in the coalesced fetch requests and returned with the data via mainline FIFO 430 in order to determine which bytes are valid and needed for the instruction stream.

In step 765 instruction stream controller 450 determines if more valid data is present in the entry read from mainline FIFO 430 in step 760 than is needed to fulfill the original popped fetch request, i.e., if there is excess valid data. Since several original fetch requests may be coalesced into a single coalesced fetch request, the data in a single entry read from mainline FIFO 430 may be needed to fulfill more than one of the popped fetch requests. Conversely, several entries may need to be popped from mainline FIFO 430 to fulfill an original fetch request with a long length. If all of the valid data in the entry is needed to fulfill the original fetch request, then in step 770 the entry read in step 760 is popped and output in the instruction stream. Note that entries are also popped when the byte mask indicates that any unread bytes are not valid and therefore not needed to fulfill a coalesced fetch request. If, in step 765 there is excess valid data, then instruction stream controller 450 returns to step 750 to pop another entry storing an original fetch request from second local FIFO 425. Note that any excess data is retained in mainline FIFO 430 since the excess data is needed for a subsequent fetch request. In some embodiments of the present invention, the excess data from mainline FIFO 430 is popped and stored in a separate register, so that it is available when needed for the subsequent original fetch request.

If, in step 755 instruction stream controller 450 determines that the original fetch request is not a mainline class fetch request, then in step 775 instruction stream controller 450 reads the subroutine data (and/or instructions) from subroutine FIFO 435. When subroutine FIFO 435 is empty, instruction stream controller 450 waits for data to be pushed onto subroutine FIFO 435 before completing step 775. In step 780 instruction stream controller 450 determines if more valid data is present in the entry read from subroutine FIFO 435 in step 775 than is needed to fulfill the original fetch request. If, in step 780 there are not excess valid data, then in step 785 the entry read in step 775 is popped and output in the instruction stream. Instruction stream controller 450 reads and pops entries from mainline FIFO 430 and subroutine FIFO 435 to generate the instruction stream according to instruction stream segment pointer FIFO 124 or 224. If, in step 780 there is excess valid data, then instruction stream controller 450 returns to step 750 to pop another entry storing an original fetch request from second local FIFO 425. Note that any excess data is retained in subroutine FIFO 435 since the excess data is needed for a subsequent fetch request. In some embodiments of the present invention, the excess data from subroutine FIFO 435 is popped and stored in a separate register, so that it is available when needed for the subsequent original fetch request.

Figure 7:
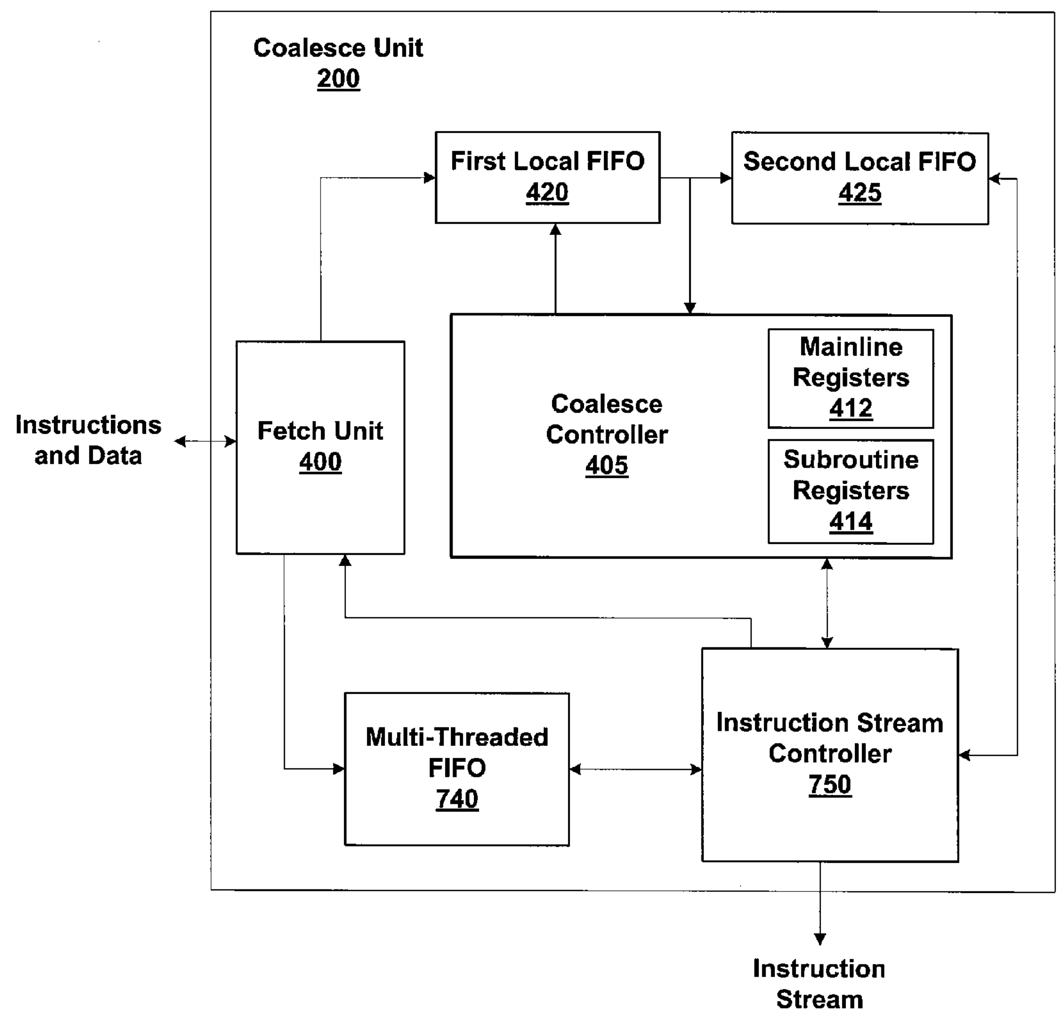
FIG. 7 is another block diagram of the coalesce unit of FIG. 2 in accordance with one or more aspects of the present invention.

FIG. 7 is another block diagram of coalesce unit 200 of FIG. 2, in accordance with one or more aspects of the present invention. Mainline FIFO 430 and subroutine FIFO 435 are replaced with a single multi-threaded FIFO 740. An advantage of multi-threaded FIFO 740 is that entries may be allocated to different fetch data classes (threads) as they are needed. In contrast, when mainline FIFO 430 and subroutine FIFO 435 are used, the number of entries available in each FIFO is fixed. In other words, entries in subroutine FIFO 435 may not be used to store mainline fetch requests and entries in mainline FIFO 430 may not be used to store subroutine fetch requests. The number of entries may be reduced in multi-threaded FIFO 740 compared with the combination of entries in mainline FIFO 430 and subroutine FIFO 435. The functionality of multi-threaded FIFO 740 is described in U.S. patent application titled, "A Multi-Threaded FIFO Memory," filed Dec. 14, 2005 and having Ser. No. 11/304,959 which is herein incorporated by reference. An instruction stream controller 750 provides the functionality of instruction stream controller 450, reading and popping entries from multi-threaded FIFO 740 by specifying the data class type.

Coalesce unit 200 advantageously combines sequential fetch requests from a set of fetch requests into longer fetch requests that match the width of a system memory interface in order to improve memory access efficiency for reading the data specified by the fetch requests. Another advantage of the disclosed system and method is that the fetches are performed after the data is available in the memory so that the fetched data is correct. The fetch requests may be for different data classes and each data class is coalesced separately, even when intervening fetch requests are for a different data class. Finally, the data read from memory is ordered according to the order of the set of fetch requests to produce the instruction stream specified by the original fetch requests.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for coalescing fetch requests for multiple data classes, comprising:

writing a first fetch request, a second fetch request, and a third fetch request to an instruction stream first-in first-out buffer (FIFO) stored in a first portion of a memory, wherein each of the fetch requests comprises a data class that indicates a type of data and a start location in a second portion of the memory, the second portion of the memory storing a combination of sets of instructions and data to be processed by the sets of instructions;

receiving the first fetch request that specifies a first data class;

receiving, following the first fetch request, a second fetch request that specifies a second data class;

receiving, following the second fetch request, a third fetch request that specifies the first data class and is sequential to the first fetch request;

aligning each fetch request to a preferred memory alignment based on a width of the memory to produce aligned fetch requests;

unrolling the aligned fetch requests to produce one or more unrolled fetch requests that do not exceed a maximum fetch request size;

combining unrolled fetch requests for the first data class to produce a coalesced fetch request for the first data class that is aligned to the preferred memory alignment and does not exceed the maximum fetch request size;

fetching first data specified by the coalesced fetch request from a memory;

fetching second data specified by the second fetch request from the memory;

outputting an instruction stream that includes the first data and the second data ordered according to the first fetch request, the second fetch request, and the third fetch request;

storing the first fetch request, second fetch request, and third fetch request in a first local FIFO;

popping the first fetch request from the first local FIFO, storing the first fetch request in a first register file that stores fetch requests for the first data class, and also storing the first fetch request in a second local FIFO;

popping the second fetch request from the first local FIFO, storing the second fetch request in a second register file that stores fetch requests for the second data class, and storing the second fetch request in the second local FIFO; and popping the third fetch request from the first local FIFO, storing the third fetch request in the first register file, and also storing the third fetch request in the second local FIFO, wherein the first fetch request and third fetch request stored in the first register file are unrolled and combined to produce the coalesced fetch request.

2. The method of claim 1, wherein the fetched first data is stored in a first data FIFO configured to store a first portion of the data read from the memory, the first portion of the data corresponding to coalesced fetch requests of the first data class, and wherein the fetched second data is stored in a second data FIFO configured to store a second portion of the data read from the memory, the second portion of the data corresponding to coalesced fetch requests of the second data class.

3. The method of claim 2, further comprising processing the instruction stream to produce an image for display, wherein the instruction stream includes a graphics data set and program instructions for processing the graphics data set.

4. The method of claim 1, wherein the step of outputting comprises:

reading a first portion of the first data from a first data FIFO to output a first portion of the instruction stream that corresponds to the first fetch request;

reading the second data from a second data FIFO to output a second portion of the instruction stream that corresponds to the second fetch request; and reading a remaining portion of the first data from the first FIFO to output a third portion of the instruction stream that corresponds to the third fetch request.

5. The method of claim 1, wherein the first data class includes the set of instructions and the second data class includes portions of the data to be processed by the sets of instructions.

6. The method of claim 1, wherein the first fetch request, the second fetch request and the third fetch request are written to the instruction stream FIFO by a device driver.

7. The method of claim 1, wherein the second portion of the memory stores a graphics data set and program instructions for processing the graphics data set.

8. The method of claim 1, wherein the aligning of the first fetch request and the third fetch request produces a first partial request that is smaller than the width of the memory and a second partial request that is smaller than the width of the memory, and further comprising combining the first partial request and the second partial request for storage in a single entry in a register file storing coalesced fetch requests for the first data class.

9. The method of claim 1, further comprising the steps of:

storing the coalesced fetch request in a first register file; and determining that space is available to store the first data in a data FIFO before the step of fetching the first data.

10. The method of claim 1, further comprising the steps of:

receiving, following the third fetch request, a fourth fetch request for the second data class that is sequential to the second fetch request;

determining that no fetch requests are available in a local FIFO that stores a copy of a portion of the instruction stream FIFO before the step of fetching the second data; and fetching fourth data specified by the fourth fetch request from the memory without coalescing the second fetch request and the fourth fetch request.

11. A system for coalescing fetch requests for multiple data classes, comprising:

a memory configured to store an instruction stream FIFO (first-in, first-out memory) stored in a first portion of the memory and a combination of sets of instructions and data to be processed by the sets of instructions stored in a second portion of the memory, the instruction stream FIFO including entries for a first fetch request that specifies a first data class, a second fetch request that specifies a second data class, and a third fetch request that specifies the first data class in an order, wherein each of the fetch requests comprises a data class that indicates a type of data and a start location in the second portion of the memory; and a coalesce unit coupled to the memory and configured to:

read the entries of the instruction stream FIFO;

combine fetch requests for the first data class that are stored in sequential locations in the memory to produce a coalesced fetch request for the first data class that is aligned to the preferred memory alignment and does not exceed the maximum fetch request size;

read data corresponding to the coalesced fetch request and the second fetch request from the memory; and order the data according to the order of the fetch requests stored in the entries of the instruction stream FIFO to produce an instruction stream, wherein the coalesce unit comprises:

a first local FIFO configured to store the first fetch request, second fetch request, and third fetch request;

a second local FIFO configured to store the first fetch request, second fetch request, and third fetch request;

a first data FIFO configured to store a first portion of the data read from the memory, the first portion of the data corresponding to coalesced fetch requests of the first data class;

a second data FIFO configured to store a second portion of the data read from the memory, the second portion of the data corresponding to coalesced fetch requests of the second data class;

a fetch unit configured to fetch data specified by the fetch requests from memory, store data specified by fetch requests for the first data class in the first data FIFO, and store data specified by fetch requests for the second data class in the second data FIFO; and a coalesce controller configured to:

pop fetch requests from the first local FIFO, determine whether the popped fetch request specifies the first data class, if the popped fetch request specifies the first data class, then store the popped fetch request in a first register file that stores fetch requests for the first data class, if the popped fetch request does not specify the first data class, then store the popped fetch request in a second register file that stores fetch requests for the second data class, and store the popped fetch request in the second local FIFO.

12. The system of claim 11, wherein the coalesce unit further comprises:

an instruction stream controller configured to produce the instruction stream by reading data stored in the first data FIFO and the second data FIFO and order the data according to the order of the fetch requests in the second local FIFO.

13. The system of 11, wherein the coalesce unit is further configured to align the fetch requests to a preferred memory alignment based on a width of the memory to produce the coalesced fetch requests.

14. The system of claim 13, wherein the coalesce unit is further configured to combine a first partial request that is smaller than the width of the memory and a second partial request that is smaller than the width of the memory for storage in a single entry in a register file storing coalesced fetch requests for the first data class when aligning the first fetch request and the third fetch request produces the first partial request and the second partial request.

15. The system of 11, further comprising a processing core coupled to the coalesce unit and configured to execute instructions in the instruction stream to process data in the instruction stream.

16. The system of 11, wherein the second portion of the memory stores a graphics data set and program instructions for processing the graphics data set to produce an image for display.

17. The system of 11, wherein the coalesce unit is further configured to copy the fetch requests from the entries of the instruction stream FIFO to a local FIFO and pop the entries from the local FIFO to order the data and produce the instruction stream.

18. The system of claim 11, further comprising a multi-threaded FIFO configured to store a first portion of the data read from the memory as a first thread type and a remaining portion of the data read from the memory as a second thread type, wherein the first portion corresponds to coalesced fetch requests of the first data class and the remaining portion corresponds to coalesced fetch requests of the second data class and a number of entries allocated to the first thread type is different than a number of entries allocated to the second thread type.

19. The system of claim 11, wherein the coalesce unit is further configured to:

store the coalesced fetch request in a first register file; and determine that space is available to store the first data in a data FIFO before the reading the data corresponding to the coalesced fetch request.

20. The system of claim 11, wherein the coalesce unit is further configured to:

read a fourth fetch request for the second data class that is sequential to the second fetch request from a local FIFO that stores a copy of a portion of the instruction stream FIFO;

determine that no additional fetch requests are available in the local FIFO; and fetching fourth data specified by the fourth fetch request from the memory without coalescing the second fetch request and the fourth fetch request.

* * * * *